United States Patent
Suwarna

(10) Patent No.: US 8,042,108 B2
(45) Date of Patent: Oct. 18, 2011

(54) VIRTUAL MACHINE MIGRATION BETWEEN SERVERS

(75) Inventor: Ignatia Suwarna, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 1614 days.

(21) Appl. No.: 11/378,554

(22) Filed: Mar. 18, 2006

(65) Prior Publication Data

US 2007/0220121 A1  Sep. 20, 2007

(51) Int. Cl.
G06F 9/455 (2006.01)
(52) U.S. Cl. .......................................................... 718/1
(58) Field of Classification Search ....................... 718/1
See application file for complete search history.

(56) References Cited

U.S. PATENT DOCUMENTS

| | | | |
|---|---|---|---|
| 6,131,155 A * | 10/2000 | Alexander et al. ............ 712/207 |
| 6,698,017 B1 | 2/2004 | Adamovits et al. | |
| 6,757,778 B1 | 6/2004 | van Rietschote | |
| 7,484,208 B1 * | 1/2009 | Nelson ............................... 718/1 |
| 7,577,722 B1 * | 8/2009 | Khandekar et al. ........... 709/220 |
| 7,669,020 B1 * | 2/2010 | Shah et al. .................... 711/162 |
| 2002/0099722 A1 * | 7/2002 | Kimura et al. ................ 707/200 |
| 2005/0060590 A1 | 3/2005 | Bradley et al. | |
| 2005/0114477 A1 * | 5/2005 | Willging et al. .............. 709/220 |
| 2005/0204013 A1 * | 9/2005 | Raghunath et al. ........... 709/217 |
| 2006/0005189 A1 * | 1/2006 | Vega et al. ......................... 718/1 |

FOREIGN PATENT DOCUMENTS

WO  WO-01/95094 A2  12/2001

OTHER PUBLICATIONS

S. Osman et al., "The design and implementation of Zap," USENIX Ass'n. 5th Symposium on OS Design and Implementation, year 2002.

* cited by examiner

*Primary Examiner* — Meng An
*Assistant Examiner* — Blake Kumabe
(74) *Attorney, Agent, or Firm* — Thomas Tyson

(57) ABSTRACT

A virtual machine is migrated between two servers. A method, at the first server, dismounts a volume on which all the files relating to the virtual machine are stored, and which was previously mounted at the first server. The method, at the second server, mounts the volume on which all the files relating to the virtual machine are stored, so that the second server can host the virtual machine. In this way, the virtual machine can be migrated without having to copy all the files from the first server to the second server. The files relating to the virtual machine are stored on a storage-area network (SAN).

20 Claims, 3 Drawing Sheets

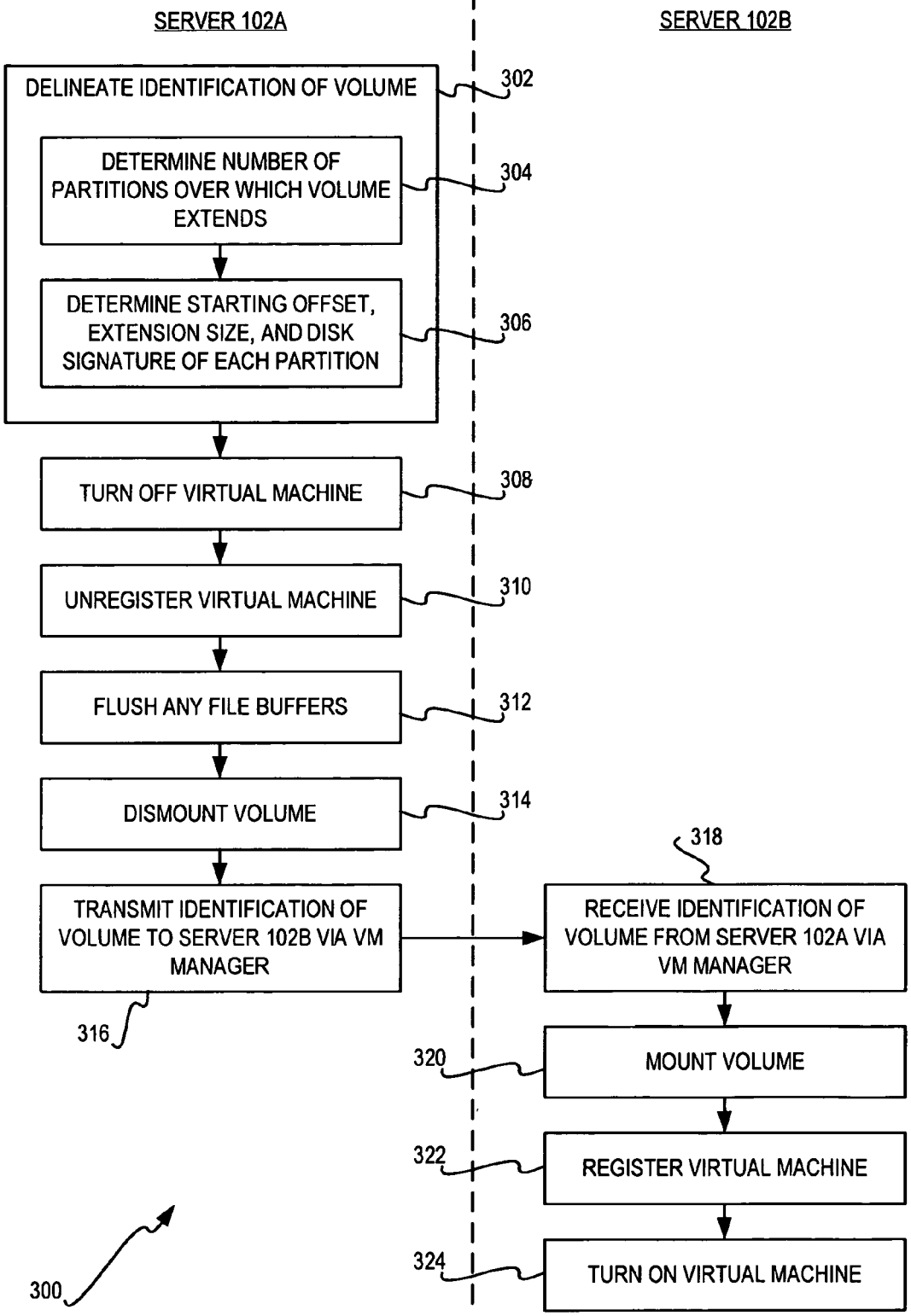

VIRTUAL MACHINE MIGRATION BETWEEN SERVERS

FIELD OF THE INVENTION

The present invention relates generally to virtual machine environments, in which guest operating systems run within virtual machines of one or more computing devices, and more particularly to migrating a virtual machine from one server to another server.

BACKGROUND OF THE INVENTION

Historically, a single computing device ran a single operating system. Each computer user, for instance, was assigned his or her own client computing device, and that computing device ran an operating system in which the user could run application programs as desired. Similarly, a server computing device ran a single operating system that ran application programs.

However, this type of computer architecture has disadvantages. First, it is costly, because each computing device needs a complete assortment of processors, memory, and input/output (I/O) devices to properly function whether it is being utilized or not. Second, the use of this type of architecture can be inefficient. At any given time, a given computing device may not be performing work, and rather is sitting idle, waiting for a task to be performed during times when workloads increase.

Therefore, a technology has been developed in which more than one operating system is capable of running on a single computing device, sharing at least the memory and the processors of the computing device. Such technology is referred to as virtualization. With virtualization, a given computing device has a number of virtual machines (VM's), or VM environments, where a guest operating system is run in each VM or VM environment. Therefore, guest operating systems for multiple computer users can be run simultaneously on a single computing device, such as a single server computing device. When workload demands are high, more VM's can be instantiated and run. When workloads are low, VM's can be suspended.

Periodically, a virtual machine may have to be migrated from one server computing device, or server, to another server computing device, or server. For instance, the server that is currently hosting the virtual machine may need to be serviced, such that the virtual machine has to be migrated to another server while the service or maintenance is being performed. As another example, a server may be currently hosting a number of other virtual machines, such that the performance of the virtual machines is suffering. Therefore, migrating one or more of these virtual machines to another server may be accomplished to increase the performance of all the virtual machines.

Within the prior art, migration of a virtual machine from a first server to a second server is typically accomplished by copying or moving all the files relating to the virtual machine from the first server to the second server. These files may include configuration files, virtual disk files, and other types of files associated with the virtual machine. Copying or moving the files to the second server may thus be a prerequisite for the virtual machine to be migrated to the second server.

However, copying or moving all the files relating to the virtual machine can be a slow process. Even with gigabit Ethernet network connections, for instance, copying or moving gigabytes of data over such a network connection can take a long time. As a result, virtual machine migration can be a slow process. For this and other reasons, therefore, there is a need for the present invention.

SUMMARY OF THE INVENTION

The present invention relates generally to migrating a virtual machine between two servers. A method of one embodiment of the invention, at the first server, dismounts a volume on which all the files relating to the virtual machine are stored, and which was previously mounted at the first server. The method, at the second server, mounts the volume on which all the files relating to the virtual machine are stored, so that the second server can host the virtual machine. In this way, the virtual machine can be migrated without having to copy or move all the files from the first server to the second server. The files relating to the virtual machine are stored on a storage-area network (SAN).

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for migrating a virtual machine from one server to another server without having to copy all the files relating to the virtual machine from the former server to the latter server, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
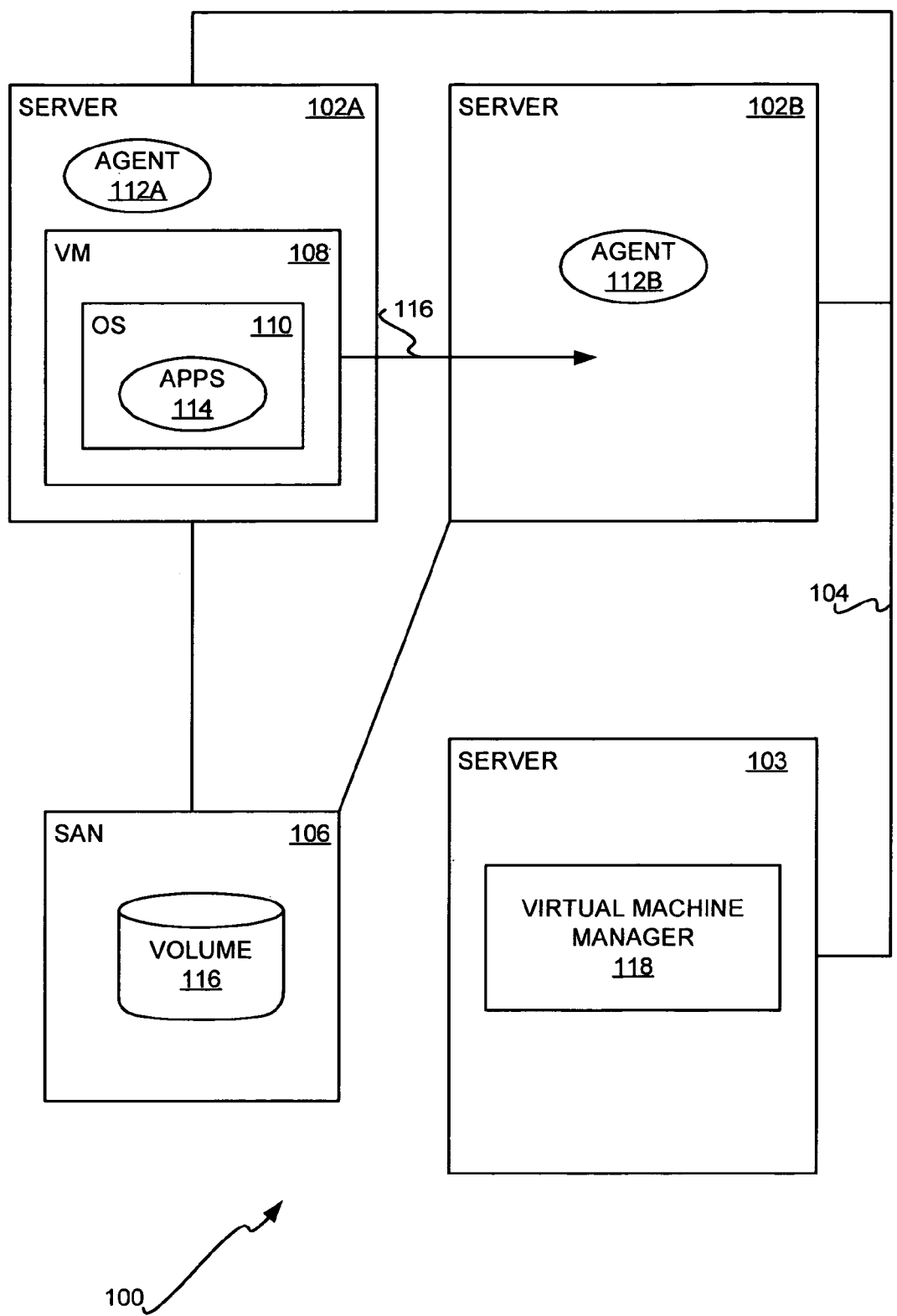
FIG. 1 is a diagram of a system including a virtual machine that is to be migrated from one server to another server, according to an embodiment of the invention.

FIG. 1 shows a system 100, according to an embodiment of the invention. The system 100 includes servers 102A and 102B, collectively referred to as the servers 102, as well as a server 103. The term server is used in a broad and general sense, and corresponds to a single computing device. Each of the servers 102 and 103 thus includes hardware, such as memory, processors, and so on, which is not specifically shown in FIG. 1. The servers 102 and 103 may in one embodiment be connected to one another via a network 104, such as an Ethernet network. The servers 102 are also all communicatively connected to a storage-area network (SAN) 106. The SAN 106 may be considered a network of storage hard disk drives. In large enterprises, the SAN 106 connects the multiple servers 102 to a centralized pool of disk storage. Compared to managing hundreds of servers, each with their own disks, SAN's improve system administration.

Each of the servers 102 may host one or more virtual machine (VM's). However, just one virtual machine (VM) 108, currently being hosted by the server 102A, is depicted in FIG. 1 for illustrative clarity and convenience. Each of the VM's is a virtualized environment that enables a corresponding guest operating system (OS) to run on it as if the OS in question were the only OS running on the server in question. In this way, a number of operating systems can run on each of the servers 102, within a number of VM's. That is, the VM's are VM environments in that each of the VM's appears to software running within the VM's as a traditional hardware environment.

It is noted, therefore, that the servers 102 are considered hypervisors, which are systems capable of hosting VM's. At least some embodiments of the invention are applicable to what are known in the art as Type II hypervisors, which, among other things, are hypervisors that run on top of operating systems. For instance, at least some embodiments of the invention are applicable to the hypervisors running on Microsoft® Windows® Server 2003 OS, available from Microsoft Corp., of Redmond, Wash.

The VM manager 118 running on the server 103 manages the VM's running on the servers 102. That is, the VM manager 118 allows for administration of the individual VM's, such as their startup, shutdown and maintenance. When a new VM is desired to be run on any of the servers 102, it is started from within the VM manager 118, and when an existing VM is desired to be shutdown, it is shutdown from within the VM manager 118. The VM manager 118 performs this functionality in relation to the servers 102A and 102B through agents 112A and 112B, collectively referred to as the agents 112, running on these servers. That is, the agents 112 are small software programs running on the servers 102A and 102B for the purposes of performing VM-related functionality on these servers.

The VM 108 thus includes an OS 110 running thereon, as well as a number of application programs 114 running on the OS 110 of the VM 108. These application computer programs 114 may be word-processing programs, spreadsheet programs, presentation programs, e-mail programs, web-browsing programs, as well as other types of application computer programs. The set of application computer programs and the OS of a given VM are referred to as a session.

As in physical machine environments, the virtual machine environment that is the VM 108 has a set of files related thereto. These files include configuration files, virtual disk files, and other types of files associated with the VM 108 that are needed for the VM 108 to properly run. In the embodiment of FIG. 1, such files are stored on a logical volume 116 of the SAN 106. The volume 116 may span, or extend, more than one partition of more than one physical hard disk drive of the SAN 106, as is described in more detail later in the detailed description.

A volume may be generally considered as the highest level of organization within a file system. A volume is an area on or extending over one or more storage devices that is managed by the file system as a discrete logical storage unit. Each storage device, such as each hard disk drive, may contain one or more partitions. Furthermore, a volume can exist on, or extend over, one or more partitions on the same or different hard disk drives. A volume that exists on one partition is considered a simple volume, and a volume that exists over more than one partition is considered a multi-partition volume.

As has been noted, the server 102A is hosting the VM 108. However, for any of a variety of different reasons, the VM 108 is to be migrated from the server 102A to the server 102B, as indicated by the arrow 116. After migration, the VM 108 is hosted by the server 102B, and not by the server 102A. Embodiments of the invention are thus concerned with migration of the VM 108 from the server 102A to the server 102B in a performance-enhanced manner.

Within the prior art, part of the migration process of the VM 108 from the server 102A to the server 102B involves copying or moving the files relating to the VM 108 from the server 102A to the server 102B. That is, the files would be individually read from the volume 116 of the SAN 106 by the server 102A, and copied over the network 104 to the server 102B. The server 102B may in turn store the files on a different volume of the SAN 106, as can be appreciated by those of ordinary skill within the art. However, this copying or moving process can be slow.

Therefore, embodiments of the invention, as part of the migration process of the VM 108 from the server 102A to the server 102B, do not copy or move the files relating to the VM 108 from the server 102A to the server 102B. Rather, in lieu of such file copying or moving, the following is performed. The volume 116 is dismounted at the server 102A, where it was previously mounted at the server 102A. Thereafter, the volume 116 is mounted at the server 102B. In this way, the files relating to the VM 108 can be accessed at the server 102B, without having to be physically copied over the network 104 from the server 102A to the server 102B.

It is noted that dismounting of the volume 116 at the server 102A, prior to mounting the volume 116 at the server 102B, is performed at least in part to avoid any corruption of data stored on the server 102A. For instance, as will be described, as part of the dismounting process, the server 102A flushes its file buffers of any data that is being temporarily stored within those buffers, so that the volume 116A as stored on the SAN 106 represents the latest version of the data of the volume 116A as may have been modified at the server 102A. Therefore, when the server 102B mounts the volume 116, it is guaranteed to be receiving the latest version of the data of the volume 116, and it is further guaranteed that the server 102A no longer has access to the volume 116, such that the server 102A cannot change the data after having dismounted the volume 116.

Mounting of a volume is the process of causing a remote volume, such as the volume 116 on the SAN 106, to be available for access locally by a server. The SAN 106, and thus the volume 116, are visible to both the servers 102A and 102B. However, only the server that has currently mounted the volume 116 is able to access the volume 116, such as read, write, modify, and delete the files stored on the volume 116. In one embodiment, just one server has the volume 116 mounted thereat at any given time. Furthermore, it is presumed herein that the user has set up the system 100 so that the volume 116 is just mounted at the server 102A at the beginning, prior to the migration process.

Thus, rather than copying or moving the files related to the VM 108 from the server 102A and 102B as part of the migration process of the VM 108, as in the prior art, embodiments of the invention dismount the volume 116 on which the files are stored, at the server 102A, and then mount the volume 116 at the server 102B. The net effect is the same, insofar as the server 102B is able to access the files regardless of whether they are copied or moved from the server 102A thereto or whether the volume 116 is dismounted at the server 102A and then mounted at the server 102B. In this way, this part of the VM migration process is performed significantly more quickly than in the prior art.

The entire migration process as performed in one embodiment of the invention is described in detail later in the detailed description in relation to FIG. 3. However, it is noted that for the volume 116 to be mounted at the server 102B after having been dismounted at the server 102A, the server 102B has to be able to identify the volume 116 within the SAN 106. That is, the server 102B has to know the identity of each partition on each hard disk drive on which the volume 116 exists.

In some situations, this is not a simple matter of the server 102A indicating the identity of the volume 116 to the server 102B, because different servers may identify volumes differently, even where the servers are running the same file system. Therefore, in one embodiment, a process is performed to delineate the partitions and the hard disk drives on which the volume 116 exists, so that the server 102B is able to properly mount the volume 116 using this information. In particular, the server 102A performs this identification process, and its agent 112A, via the VM manager 118, notifies the agent 112B on the server 102B of the identity of the volume 116 so that the volume 116 can be properly mounted at the server 102B after having been dismounted at the server 102A.

Figure 2:
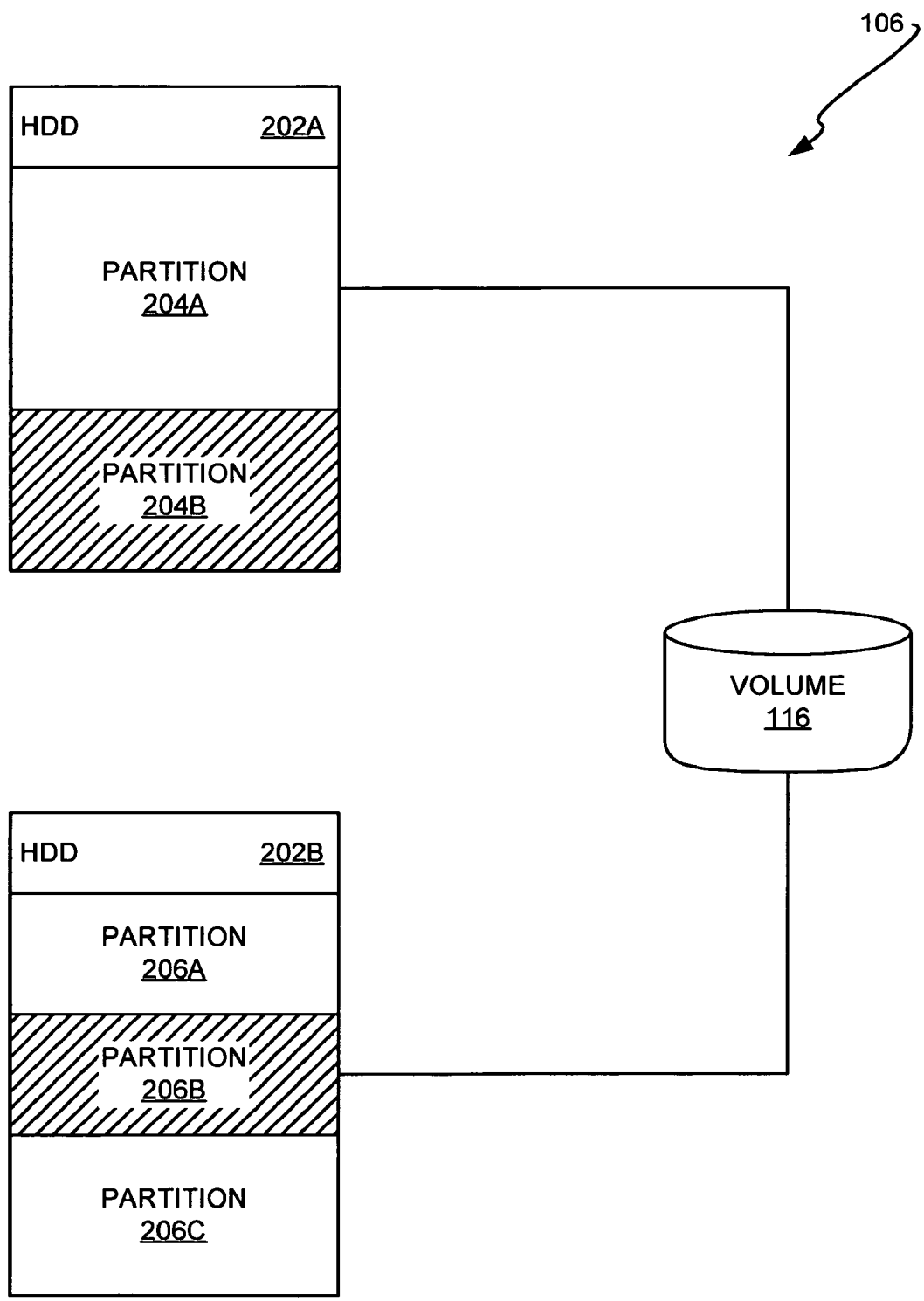
FIG. 2 is a diagram of an example and representative storage-area network (SAN), on which a logical volume storing the files relating to a virtual machine physically exists over a number of partitions of a number of hard disk drives, according to an embodiment of the invention.

FIG. 2 shows a representative example of the SAN 106, according to an embodiment of the invention. The SAN 106 includes two physical hard disk drives 202A and 202B, collectively referred to as the hard disk drives 202. The hard disk drive 202A is divided into two partitions 204A and 204B, collectively referred to as the partitions 204. The hard disk drive 202B has been divided into three partitions 206A, 206B, and 206C, collectively referred to as the partitions 206.

The volume 116 includes, or extends over, or exists on the partition 204B of the hard disk drive 202A, and the partition 206B of the hard disk drive 202B. Therefore, these partitions 204B and 206B, as well as their hard disk drives 202A and 202B, respectively, have to be identified in a server-neutral and substantially universal way, so that the server 102B is able to have the volume 116 mounted thereat. That is, the server 102A has to provide a server-neutral and substantially universal identification of the partitions 204B and 206B on the hard disk drives 202A and 202B, respectively, and provide this identification to the server 102B, for the server 102B to be able to mount the volume 116 after the server 102A has dismounted the volume 116.

In one embodiment, as is described in more detail later in the detailed description in relation to FIG. 3, the server 102A obtains the following information for each partition, or extension, of the volume 116. First, a signature of the hard disk drive on which each partition, or extension, of the volume 116 is obtained. The signature of a hard disk drive uniquely identifies that drive in a server-neutral and substantially universal way, such that the signature of the drive is the same to both the server 102A and the server 102B. Next, the starting offset on the hard disk drive in question for each partition is obtained. The starting offset specifies where a given partition starts on the hard disk drive. Finally, the size of the extension, or the partition, for each partition is obtained.

Thus, by determining the unique signature of a hard disk drive for each partition, and where each partition, or extension, starts on the hard disk drive, and the size of each partition, or extension, a server-neutral and substantially universal identification of the volume 116 is obtained. This identification includes a list of the unique hard disk drive signature, the starting offset, and the size, of each partition, or extension, on which the volume 116 exists. Using this information, the server 102B is able to properly mount the volume 116 after it has been dismounted at the server 102A.

FIG. 3 shows a method 300 for migrating the VM 108 from the server 102A to the server 102B, according to a particular embodiment of the invention. Communication between the server 102A and the server 102B is accomplished within the method 300 via the VM manager 118 running on the server 103. As depicted in FIG. 3, some parts of the method 300 are specifically performed by the server 102A, such as by the agent 112A running thereon, whereas other parts are specifically performed by the server 102B, such as by the agent 112B running thereon. Furthermore, although a particular ordering of the performance of the parts of the method 300 is shown in FIG. 3, in other embodiments, the method 300 may be performed at least in a partially different order, as can be appreciated by those of ordinary skill within the art.

The server 102A first delineates the identification of the volume 116 that stores all the files related to the VM 108. This identification, as has been described, is a server-neutral and substantially universal identification of the volume 116, in that this identification can appropriately identify the volume 116 to both the server 102A and the server 102B. In one embodiment, the server 102A first determines the number of partitions, or extensions, over which the volume 116 extends. For each partition or extension, the server 102A determines the starting offset, the extension size, and the disk signature. The set of all the starting offsets, extension sizes, and disk signatures for all the partitions or extensions of the volume 116 make up the identification of the volume 116.

For example, in relation to the Microsoft® Windows® Server 2003 operating system, available from Microsoft Corp., of Redmond, Wash., the application programming interface (API) DeviceIoControl exposed by the OS may be called for each extension of partition of the volume 116, via the control code IOCTL_VOLUME_GET_VOLUME_DISK_EXTENTS. In return, the OS provides the disk number, starting offset, and the extension size of the partition in question. However, the disk number, specifying a hard disk drive of the SAN 106, is not universal, and rather is particular just to the server 102A. Therefore, the API DeviceIoControl is again called, with the control code IOCTL_DISK_GET_DRIVE_LAYOUT_EX, to obtain a disk signature for the particular disk number. The disk signature, by comparison, is universal and server neutral.

The VM 108 is then turned or powered off (308). Turning off or powering off in this sense is itself a virtual operation, since the server 102A is not physically turned off, but rather the VM 108 is virtually turned off, as can be appreciated by those of ordinary skill within the art. In one embodiment, such turning or powering off is accomplished by calling an appropriate API exposed by the given virtualization environment software being employed.

Thereafter, the VM 108 is unregistered, or deregistered, at the server 102A (310). Unregistration, or deregistration, of the VM 108 at the server 102A means that the server 102A is no longer hosting the VM 108. Because only one server can host a given VM at any given time, the VM 108 is now partially ready to be hosted at the server 102B. Deregistration, or unregistration, can in one embodiment also be accomplished by calling an appropriate API exposed by the given virtualization environment software being employed.

Next, any file buffers at the server 102A that may be temporarily buffering data of the files relating to the VM 108 on the volume 116 are flushed (312). Buffer flushing ensures that the most recent and correct version of all the files relating to the VM 108 are properly reflected on the physical hard disk drives on which the volume 116 exists, and not only in the file buffers themselves, as can be appreciated by those of ordinary skill within the art. Buffer flushing may in relation to the Microsoft® Windows® Server 2003 OS be accomplished by calling the FlushFileBuffers API.

The volume 116 is then dismounted from the server 102A (314), so that it can be mounted at the server 102B for hosting of the VM 108 at the server 102B. Dismounting the volume 116 means that the volume 116 is no longer accessible by the server 102A, even though the SAN 106 on which the volume 116 exists remains visible to the server 102A. In one embodiment, in relation to the Microsoft® Windows® Server 2003 OS, the DeviceIoControl API is controlled with the control code FSCTL_DISMOUNT_VOLUME to dismount the volume 116, and thereafter the API DeleteVolumeMountPoint is called to completely remove the volume 116 from being accessible at the server 102A.

Finally, the server 102A transmits the identification of the volume 116, previously determined in part 302 of the method 300, to the server 102B, via or through the VM manager 118 running on the server 103 (316). For instance, the agent 112A running on the server 102A may communicate the identification of the volume 116 to the VM manager 118 running on the server 103, which it turn communicates the identification of the volume 116 to the agent 112B running on the server 102B. Thus, the server 102B receives the identification of the volume 116 from the server 102A via the VM manager 118 running on the server 103 (318).

The server 102B then mounts the volume 116 using the identification of the volume 116 that has been provided by the server 102 (320). Mounting the volume 116 may include first ensuring that the volume 116 can be properly found on the SAN 106. For instance, the server 102B may, in relation to the Microsoft® Windows® Server 2003 OS, call the API FindFirstVolume to find the first volume on the SAN 106, and then step through all the volumes on the SAN 106 by calling the API FindNextVolume in an iterative manner. For each volume found, the disk signatures, starting offsets, and extension sizes of the partitions, of the volume are compared to the identification of the volume 116 provided by the server 102A. Once the identical volume has been found, the server 102B then mounts the volume 116, such as by using the API SetVolumeMountPoint as exposed by the Microsoft® Windows® Server 2003 OS.

Thereafter, the server 102B registers the VM 108 (322). Registration of the VM 108 means that the server 102B is now hosting the VM 108. Thus, the VM 108 has been migrated from the server 102A to the server 102B, without having to copy all the files relating to the VM 108 from the server 102A to the server 102B. The VM 108 is now accessible, and can now be turned on as needed (324), by calling an appropriate API of the given virtualization environment software being employed.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A method for migrating a virtual machine from a first server to a second server, comprising:
   at the first server,
      turning off the virtual machine;
      after turning off the virtual machine, dismounting a volume on which all files relating to the virtual machine are stored and which was previously mounted at the first server, such that upon dismounting, the volume is no longer accessible at the first server; and,
      prior to dismounting the volume, delineating a server-neutral identification of the volume;
      transmitting the server-neutral identification of the volume to the second server;
   at the second server,
      after the volume has been dismounted at the first server, mounting the volume on which all the files relating to the virtual machine are stored;
      after mounting the volume, turning on the virtual machine, such that the virtual machine is migrated from the first server to the second server without copying all the files relating to the virtual machine from the first server to the second server.

2. The method of claim 1, further comprising, at the first server, prior to dismounting the volume, unregistering the virtual machine at the first server.

3. The method of claim 1, further comprising, at the first server, prior to dismounting the volume, flushing any file buffers of the first server that have buffered any of the files relating to the virtual machine.

4. The method of claim 1, further comprising, at the second server, after mounting the volume, registering the virtual machine at the second server.

5. The method of claim 1, where the server-neutral identification of the volume is a server-neutral and substantially universal identification of the volume.

6. The method of claim 5, further comprising, at the second server, prior to mounting the volume, receiving the server-neutral and substantially universal identification of the volume from the first server, wherein the identification of the volume is used by the second server to mount the volume thereat.

7. The method of claim 5, wherein delineating the server-neutral and substantially universal identification of the volume comprises:
   determining a number of partitions over which the volume extends; and,
   for each partition over which the volume extends,
      determining a starting offset, extension size, and disk signature of the partition, wherein the identification of the volume includes the starting offset, extension size, and disk signature for each partition over which the volume extends.

8. The method of claim 1, wherein the files relating to the virtual machine are physically located on a storage-area network (SAN), are visible to both the first server and the second server, but initially accessible just to the first server.

9. A system comprising:
   a storage-area network (SAN) physically storing all files relating to a virtual machine over one or more partitions of hard disks of the SAN;
   a first server at which a volume logically storing all the files relating to the virtual machine is mounted and at which the virtual machine is hosted;
   a second server to which the virtual machine is to be migrated;
   a first agent running on the first server to dismount the volume; and,
   a second agent running on the second server to mount the volume at the second server, wherein the virtual machine is migrated from the first server to the second server without copying all the files relating to the virtual machine from the first server to the second server, by:

the virtual machine being turned off at the first server, and after the virtual machine being turned off at the first server, a volume on the SAN and on which all the files relating to the virtual machine are stored being dismounted at the first server, such that upon dismounting, the volume is no longer accessible at the first server, and after the volume has been dismounted at the first server, the volume being mounted at the second server, and after the volume has been mounted at the second server, the virtual machine turned on at the second server, wherein the first agent is further to delineate a server-neutral identification of the volume prior to dismounting the volume, and to transmit the identification of the volume to the second agent.

10. The system of claim 9, wherein the first agent is further to turn off the virtual machine and unregister the virtual machine from the first server prior to dismounting the volume.

11. The system of claim 9, wherein the second agent is further to register the virtual machine at the second server, such that the virtual machine is hosted at the second server, and to turn on the virtual machine, after mounting the volume.

12. The system of claim 9, further comprising a third server hosting a virtual machine manager, wherein the first agent is to transmit the identification of the volume to the second agent via the virtual machine manager, and wherein the second agent is to receive the identification of the volume from the first agent via the virtual machine manager, and is to use the identification of the volume to mount the volume thereat.

13. The system of claim 12, wherein the identification of the volume comprises, for each partition over which the volume extends, a starting offset, extension size, and disk signature of the partition.

14. An article of manufacture comprising:

a non-transitory and tangible computer-readable medium; and, means in the medium for migrating a virtual machine from a first server to a second server without having to copy all files relating to the virtual machine from the first server to the second server, wherein a part of the means at the first server turns off the virtual machine at the first server, and after turning off the virtual machine at the first server dismounts at the first server a volume on which all the files relating to the virtual machine are stored, such that upon dismounting, the volume is no longer accessible at the first server, wherein a part of the means at the second server of the means mounts at the second server the volume on which all the files relating to the virtual machine are stored after the volume has been dismounted at the second server, and after mounting the volume at the second server turns on the virtual machine at the second server, and wherein the part of the means at the first server is to delineate a server-neutral identification of the volume prior to dismounting the volume, and to transmit the identification of the volume to the part of the means at the second server.

15. The article of manufacture of claim 14, wherein the part of the means at the first server unregisters the virtual machine from the first server prior to dismounting the volume.

16. The article of manufacture of claim 14, wherein the part of the means at the second server registers the virtual machine at the second server after mounting the volume.

17. The article of manufacture of claim 14, wherein the server-neutral identification of the volume is a server-neutral and substantially universal identification of the volume.

18. The article of manufacture of claim 17, wherein the part of the means at the second server is to receive the identification of the volume, and to use the identification of the volume to mount the volume thereat.

19. The article of manufacture of claim 17, wherein the identification of the volume comprises, for each of one or more partitions over which the volume extends, starting offset, extension size, and disk signature of the partition.

20. The article of manufacture of claim 14, wherein the files relating to the virtual machine are physically located on a storage-area network (SAN), are visible to both the first server and the second server, but initially accessible just to the first server.

\* \* \* \* \*